(12) United States Patent
Satyanarayana et al.

(10) Patent No.: US 12,203,544 B2
(45) Date of Patent: Jan. 21, 2025

(54) TWO-SPEED TRANSMISSION SYSTEM FOR AN ELECTRIC VEHICLE

(71) Applicant: Schaeffler Technologies AG & Co. KG, Herzogenaurach (DE)

(72) Inventors: PS Satyanarayana, Pune (IN); Prajod Ayyappath, Pune (IN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 18/012,739

(22) PCT Filed: Jun. 28, 2021

(86) PCT No.: PCT/EP2021/067707
§ 371 (c)(1),
(2) Date: Dec. 23, 2022

(87) PCT Pub. No.: WO2022/002856
PCT Pub. Date: Jan. 6, 2022

(65) Prior Publication Data
US 2023/0250875 A1 Aug. 10, 2023

(51) Int. Cl.
*F16D 13/52* (2006.01)
*B60K 1/00* (2006.01)
(Continued)

(52) U.S. Cl.
CPC ............. *F16H 63/302* (2013.01); *B60K 1/00* (2013.01); *F16D 13/52* (2013.01); *F16H 3/089* (2013.01);
(Continued)

(58) Field of Classification Search
CPC ......... F16D 13/00–74; F16D 25/00–14; F16H 3/089–091; F16H 2200/0021; F16H 63/302; F16H 2063/3093
See application file for complete search history.

(56) References Cited

U.S. PATENT DOCUMENTS 5,642,795 A * 7/1997 Miura ..................... F16D 41/07
60/345
5,928,104 A * 7/1999 Kimura ................... F16H 57/08
475/318
(Continued)

FOREIGN PATENT DOCUMENTS

| CN | 101704340 | | 5/2010 | |
|---|---|---|---|---|
| CN | 104755816 A | * | 7/2015 | .............. F16D 11/10 |

(Continued)

*Primary Examiner* — Stacey A Fluhart
*Assistant Examiner* — Lillian T Nguyen
(74) *Attorney, Agent, or Firm* — Volpe Koenig

(57) ABSTRACT

A two-speed transmission system for an electric vehicle is disclosed. The system includes a housing, a one-way clutch assembly adapted to be mounted on an input shaft and to be coupled with a first gear drive assembly, a multi-plate friction clutch assembly adapted to be mounted on the input shaft and having a clutch hub disposed in the housing and mounted on the input shaft, a second gear drive assembly freely mounted on the input shaft and having external spline on an outer diameter adapted to be engaged with the clutch hub of the multi-plate friction clutch assembly. The one-way clutch assembly is adapted to rotate to operate the vehicle in the first gear drive when the input shaft is rotated in a drive direction, and the multi-plate friction clutch assembly is in a disengaged state when the vehicle is operated in the first gear drive.

19 Claims, 15 Drawing Sheets

(51) Int. Cl.
*F16H 3/089* (2006.01)
*F16H 59/24* (2006.01)
*F16H 59/44* (2006.01)
*F16H 59/68* (2006.01)
*F16H 61/68* (2006.01)
*F16H 63/30* (2006.01)
*F16H 57/02* (2012.01)

(52) U.S. Cl.
CPC ............ *F16H 59/24* (2013.01); *F16H 59/44* (2013.01); *F16H 59/68* (2013.01); *F16H 61/68* (2013.01); *B60K 2001/001* (2013.01); *F16H 2057/02034* (2013.01); *F16H 2057/02052* (2013.01); *F16H 2063/3093* (2013.01); *F16H 2200/0021* (2013.01); *F16H 2200/0034* (2013.01)

(56) References Cited

U.S. PATENT DOCUMENTS

| | | | | |
|---|---|---|---|---|
| 6,129,648 | A * | 10/2000 | Tanioka | F16H 1/46 475/342 |
| 6,830,531 | B1 * | 12/2004 | Koenig | F16H 3/66 475/263 |
| 6,935,476 | B2 * | 8/2005 | Kurmaniak | F16D 27/115 310/49.01 |
| 7,681,705 | B2 * | 3/2010 | Okada | F16D 13/56 192/54.5 |
| 9,033,851 | B2 | 5/2015 | Itakura et al. | |
| 11,181,173 | B1 * | 11/2021 | Park | B60K 17/02 |
| 2003/0094343 | A1 * | 5/2003 | Showalter | F16D 47/00 192/70.23 |
| 2004/0144576 | A1 * | 7/2004 | Hashimoto | B60K 6/442 903/905 |
| 2017/0089452 | A1 * | 3/2017 | Deutsch | F16D 13/52 |
| 2018/0216672 | A1 | 8/2018 | Putzer et al. | |
| 2020/0096084 | A1 * | 3/2020 | Engerman | F16H 3/006 |
| 2022/0128124 | A1 * | 4/2022 | Engerman | F16H 57/0435 |

FOREIGN PATENT DOCUMENTS

DE 102018129927 6/2019
DE 102019003004 A1 * 10/2020

* cited by examiner

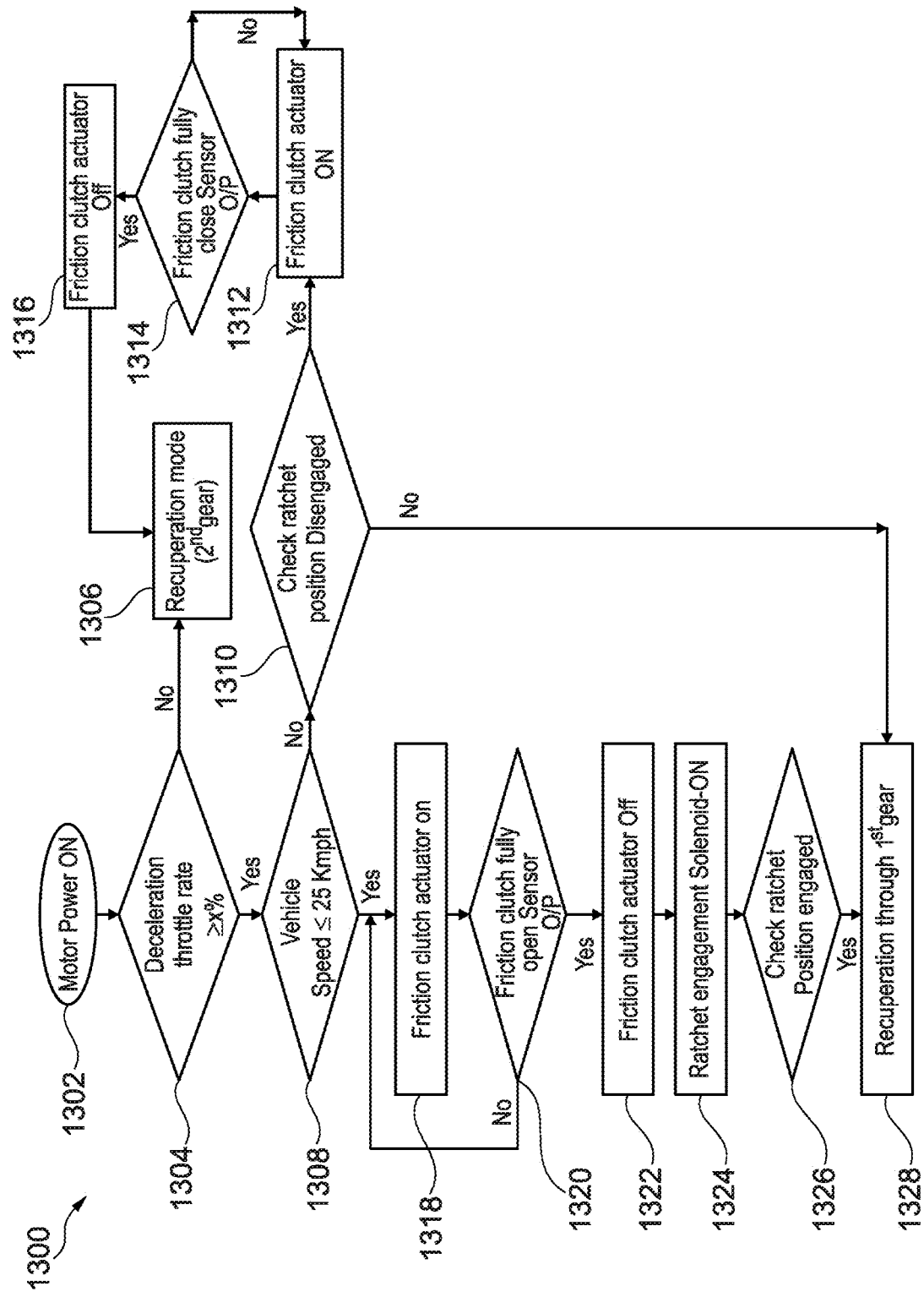

TWO-SPEED TRANSMISSION SYSTEM FOR AN ELECTRIC VEHICLE

CROSS-REFERENCE TO RELATED APPLICATIONS

This application is the U.S. National Phase of PCT Appln. No. PCT/EP2021/067707, filed Jun. 28, 2021, which claims the benefit of Indian Patent Appln. No. 202011027597, filed Jun. 29, 2020, the entire disclosures of which are incorporated by reference herein.

TECHNICAL FIELD

The present disclosure relates to electric vehicles and more particularly, relates to a two-speed transmission system for an electric vehicle.

BACKGROUND

In the last few decades, significant growth and development is witnessed in the realm of electric vehicles. Factors, such as space constraint, gradeability, and weight have proven to be the primary concerns in the current stage of development of the electric vehicles.

Generally, electric vehicles, such as four-wheelers buses and trucks are equipped with a single speed fixed transmission with an objective of minimizing drive train mass, volume, losses, and associated cost. Further, such electric vehicles also include a Brushless Direct Current (BDLC) motor for providing operational power to the transmission. The torque and speed characteristic of the existing type of BDLC motor is such that the vehicles achieve good low speed torque, but at the expense of top vehicle speeds. Therefore, while these vehicles can achieve gradeability, i.e., low-speed torque, they cannot achieve higher speeds.

Now, in case of Rickshaw and cargo electric vehicles, even consumers expect higher payload capacity and gradeability performance from the vehicle instead of increased energy efficiency, so that the vehicle can accommodate a greater number of passengers. This is also because the running cost of the electric vehicles is much lower than the running cost of an Internal Combustion Engine-powered vehicles. However, with the advent of electric vehicle technologies, increase in fuel efficiency is now desired even in the electric vehicles as far as it does not hamper the payload capacity of the vehicle.

Now, to achieve both the gradeability and the higher top speed for these vehicles, bigger capacity motors are required. However, incorporating bigger capacity motors and associated components would lead to certain issues, such as space constraints in the electric vehicle and an undesirable increase in an overall weight of the vehicle.

SUMMARY

This summary is provided to introduce a selection of concepts, in a simplified format, that are further described in the detailed description. This summary is neither intended to identify key or essential inventive concepts of the disclosure and nor is it intended for determining the scope of the disclosure.

In an embodiment of the present disclosure, a two-speed transmission system for an electric vehicle is disclosed. The two-speed transmission system includes a housing, a one-way clutch assembly adapted to be mounted on an input shaft and to be coupled with a first gear drive, and a multi-plate friction clutch assembly adapted to be mounted on the input shaft. The multi-plate friction clutch assembly includes a clutch hub disposed in the housing and mounted on the input shaft. The system includes a second gear drive freely mounted on the input shaft and having external spline on an outer diameter adapted to be engaged with the clutch hub of the multi-plate friction clutch assembly. The one-way clutch assembly is adapted to rotate to operate the vehicle in the first gear drive when the input shaft is rotated in a drive direction, and the multi-plate friction clutch assembly is in a disengaged state when the vehicle is operated in the first gear drive.

In another embodiment of the present disclosure, an electric vehicle is disclosed. The electric vehicle includes an electric motor, an input shaft coupled with the electric motor, and a two-speed transmission system coupled to the input shaft. The two-speed transmission system includes a housing, a one-way clutch assembly adapted to be mounted on an input shaft and to be coupled with a first gear drive, and a multi-plate friction clutch assembly adapted to be mounted on the input shaft. The multi-plate friction clutch assembly includes a clutch hub disposed in the housing and mounted on the input shaft. The system includes a second gear drive freely mounted on the input shaft and having external spline on an outer diameter adapted to be engaged with the clutch hub. The one-way clutch assembly is adapted to rotate to operate the vehicle in the first gear drive when the input shaft is rotated in a drive direction, and the multi-plate friction clutch assembly is in a disengaged state when the vehicle is operated in the first gear drive.

To further clarify advantages and features of the present disclosure, a more particular description will be rendered by reference to specific embodiments thereof, which is illustrated in the appended drawings. It is appreciated that these drawings depict only typical embodiments according to the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 13 illustrates a flow chart depicting a method of recuperation in the two-speed transmission system, according to another embodiment of the present disclosure.

Figure 1:
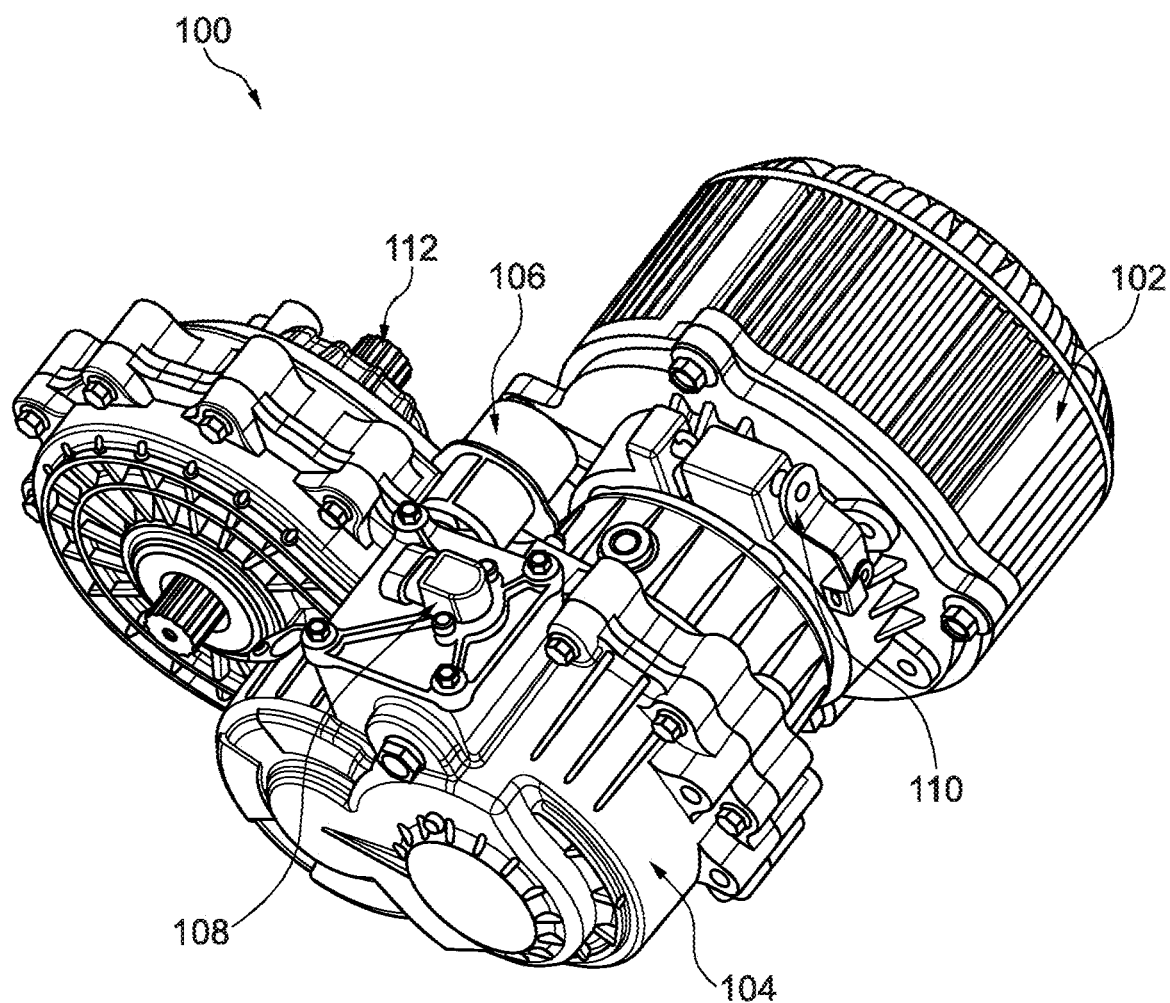
FIG. 1 illustrates a schematic perspective view of a two-speed transmission system of an electric vehicle, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting.

Embodiments of the present disclosure will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

FIG. 1 illustrates a schematic perspective view of a transmission architecture 100 of an electric vehicle, according to an embodiment of the present disclosure. In an embodiment, the transmission architecture 100 maybe employed in a three-wheeler or a four-wheeler vehicle. For the ease of readability, the electrical vehicle is hereinafter interchangeably referred to as the vehicle. The transmission architecture 100 is shown to include an electric motor 102 to provide drive, a two-speed transmission system 104 coupled with the electric motor 102, a clutch actuation motor 106 adapted to actuate clutch operation, a clutch position sensor 108 adapted to detect a position of the clutch, a reverse gear actuation system 110 adapted to actuate a reverse gear drive, and a differential output shaft 112. For the ease of readability, the two-speed transmission system 104 is hereinafter interchangeably referred to as the transmission system 104.

Figure 2:
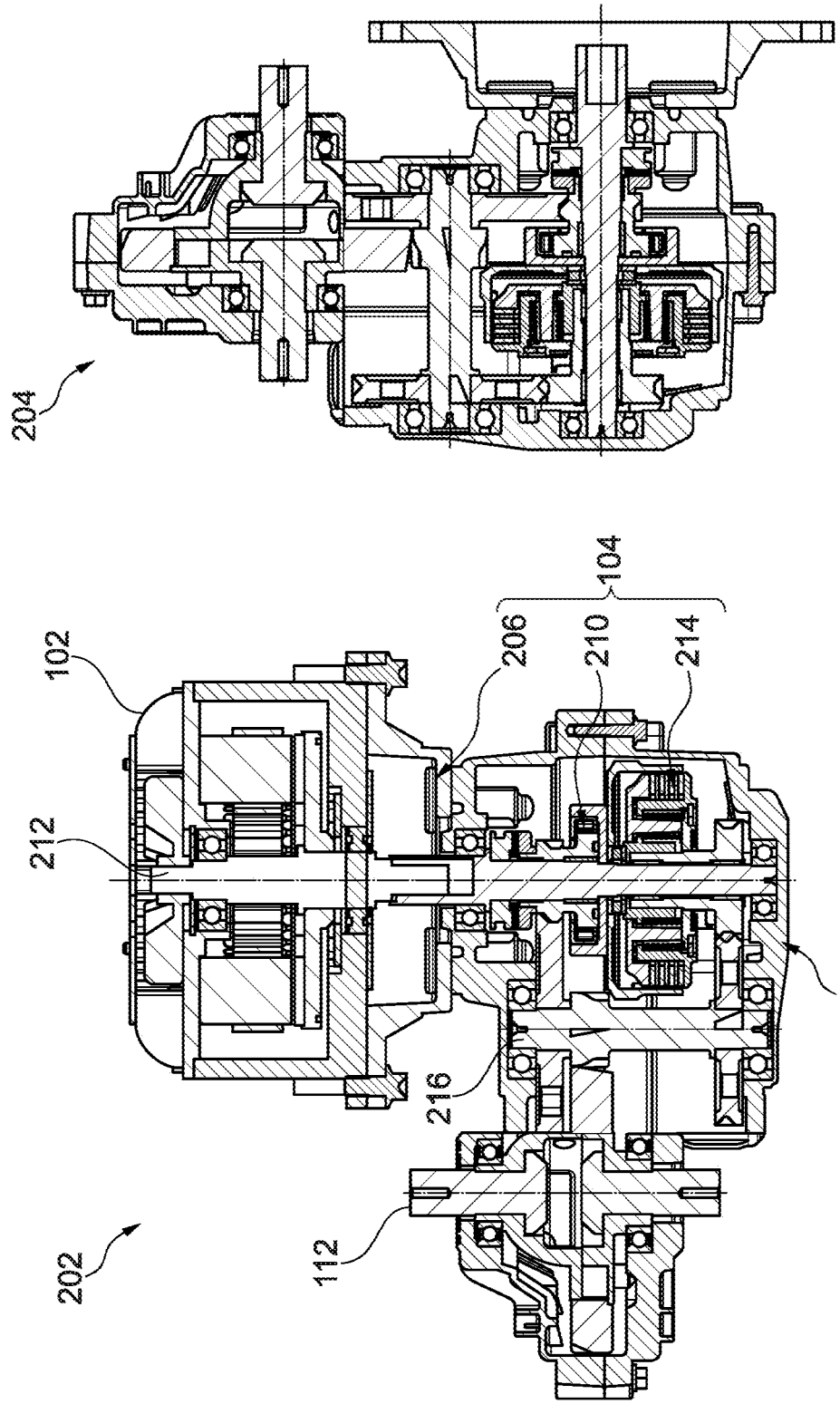
FIG. 2 illustrates a front cross-sectional view and side cross-sectional view of the two-speed transmission system, according to an embodiment of the present disclosure.
Figure 3:
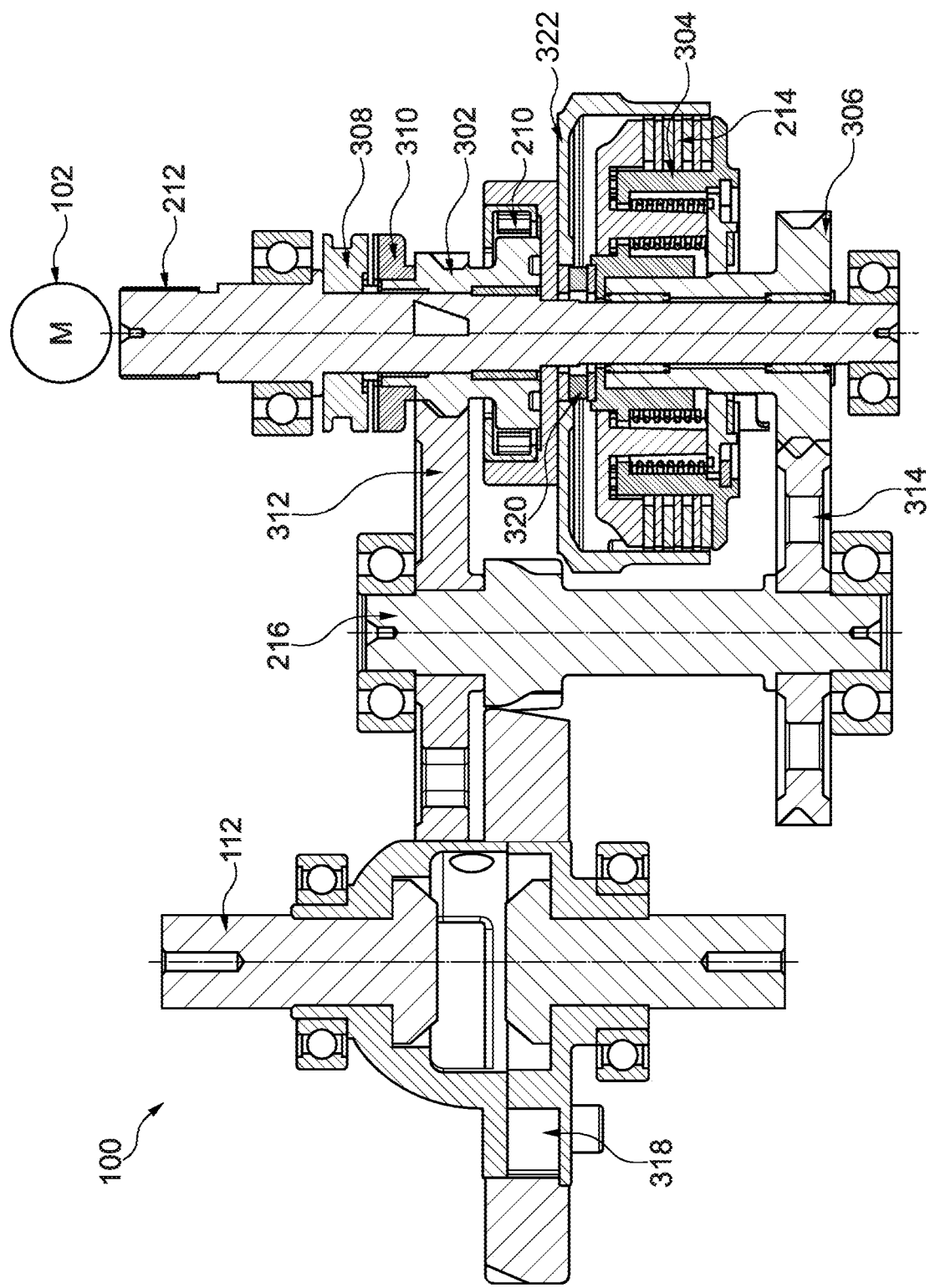
FIG. 3 illustrates a magnified front cross-sectional view of the two-speed transmission system, according to an embodiment of the present disclosure.

FIG. 2 illustrates a front cross-sectional view 202 and a side cross-sectional view 204 of the transmission architecture 100, according to an embodiment of the present disclosure. The electric vehicle may include an adapter flange 206 adapted to couple the electric motor 102 with a housing 208 of the transmission system 104. In an embodiment, the adapter flange 206 may be mounted by using bolts. Due to the adapter flange 206, the transmission system 104 may be conveniently coupled with different motors. FIG. 3 illustrates a magnified front cross-sectional view of the transmission architecture 100 depicting various components, according to an embodiment of the present disclosure. Referring to FIG. 1, FIG. 2, and FIG. 3, the transmission system 104 may include, but is not limited to, the housing 208, a one-way clutch assembly 210 adapted to be mounted on an input shaft 212 and to be coupled with a first gear drive assembly 302, and a multi-plate friction clutch assembly 214 adapted to be mounted on the input shaft 212. In an embodiment, the input shaft 212 may be coupled with the electric motor 102 through a key or a spline interface.

In an embodiment, a housing of the one-way clutch assembly 210 may be coupled with a housing 322 of the multi-plate friction clutch assembly 214. Particularly, the housing 322 of the multi-plate friction clutch assembly 214 may include a riveted one-way clutch flange positioned on the input shaft 212. Further, the one-way clutch flange may be adapted to be press-fitted into the housing of the one-way clutch assembly 210.

In another embodiment, the housing of the one-way clutch assembly 210 may be an integral part of the housing 322 of the multi-plate friction clutch assembly 214. In such an embodiment, both the housings may be formed of the same material and the one-way clutch assembly 210 may be press-fitted on to the housing 322 of the multi-plate friction clutch assembly 214. In the present embodiment, the need of the one-way clutch flange and the riveting is eliminated.

The multi-plate friction clutch assembly 214 may include, but is not limited to, a clutch hub 304 disposed in the housing 208 and mounted on the input shaft 212. In an embodiment, the multi-plate friction clutch assembly 214 may include at least one roller bearing 320 adapted to be disposed between the input shaft 212 and the clutch hub 304 to minimize friction. The at least one roller bearing 320 may be an axial thrust bearing. Further, the multi-plate friction clutch assembly 214 may also include a friction plate having outer lugs adapted to slide in the housing, a pressure plate having lugs on an internal diameter adapted to slide an outer diameter of the clutch hub 304, and a number of compression springs adapted to exert clamping pressure to keep the friction plate and the pressure plate together.

Further, the transmission system 104 may also include a second gear drive assembly 306 freely mounted on the input shaft 212. The second gear drive assembly 306 may include, but is not limited to, external spline on an outer diameter adapted to be engaged with the clutch hub 304 of the multi-plate friction clutch assembly 214.

In an embodiment, the one-way clutch assembly 210 may be adapted to rotate to operate the vehicle in the first gear drive when the input shaft 212 is rotated in a drive direction. Further, the multi-plate friction clutch assembly 214 may be in a disengaged (open) state when the vehicle is operated in the first gear drive. In such an embodiment, the second gear drive assembly 306 may be adapted to freely rotate along with the clutch hub 304 of the multi-plate friction clutch assembly 214 on the input shaft 212.

In another embodiment, when the vehicle is operated in a second gear drive, the multi-plate friction clutch assembly 214 may be adapted to be in an engaged state. In such an embodiment, owing to the engaged state of the multi-plate friction clutch assembly 214, the drive from the motor 102 is transmitted through the second gear drive assembly 306 to operate the vehicle in the second gear drive.

In an embodiment, the first gear drive assembly 302 and the second gear drive assembly 304 may be coupled with a first gear driven assembly 312 and a second gear driven assembly 314, respectively. The first gear driven assembly 312 and the second gear driven assembly 314 may then be coupled with a counter shaft 216. The counter shaft 216 may be coupled to a differential gear assembly 318 mounted on the differential output shaft 112.

In an embodiment, the transmission system 104 may include a speed sensor adapted to detect a speed of the vehicle and a throttle sensor adapted to detect driving load of the vehicle. In an embodiment, the sensors may not be separate new components to be employed in the vehicle. In fact, the sensors may be understood as an existing sensor of the vehicle, for example, of an Electronics Control Unit of the vehicle. For example, the sensors 214 may be associated with a tachometer or a speedometer of the vehicle.

Further, the speed sensor and the throttle sensor may be in communication with a controller of the transmission system 104. In an embodiment, the controller may include, but is not limited to, a processor, a memory, modules, and data. The modules and the memory may be coupled to the processor. The processor can be a single processing unit or several units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor may be configured to fetch and execute computer-readable instructions and data stored in the memory.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform tasks or implement data types. The modules may also be implemented as, signal processor(s), state machine (s), logic circuitries, and/or any other device or component that manipulate signals based on operational instructions.

Further, the modules can be implemented in hardware, instructions executed by a processing unit, or by a combination thereof. The processing unit can comprise a computer, a processor, such as the processor, a state machine, a logic array, or any other suitable devices capable of processing instructions. The processing unit can be a general-purpose processor which executes instructions to cause the general-purpose processor to perform the required tasks or, the processing unit can be dedicated to perform the required functions. In another embodiment of the present disclosure, the modules may be machine-readable instructions (software) which, when executed by a processor/processing unit, perform any of the described functionalities. Further, the data serves, amongst other things, as a repository for storing data processed, received, and generated by one or more of the modules.

The controller may be adapted to control an operational state of the multi-plate friction clutch assembly 214 based on the speed of the vehicle and the driving load of the vehicle. The operational state of the multi-plate friction clutch assembly 214 may include, but is not limited to, the engaged state and the disengaged state.

As explained earlier, based on the operational state of the multi-plate friction clutch assembly 214, the wheels of the vehicle are provided with the drive from the electric motor 102, either from the first gear drive assembly 302 or the second gear drive assembly 306. Further, the operational state of the multi-plate friction clutch assembly 214 may be selected or actuated based on the speed and the driving load of the vehicle. In an embodiment, the clutch actuation motor 106 may be adapted to control the operational state of the multi-plate friction clutch assembly 214. Therefore, based on the speed and the driving load of the vehicle, the controller may control the operation of the clutch actuation motor 106 to switch between the operational states of the multi-plate friction clutch assembly 214.

Particularly, the clutch actuation motor 106 may be adapted to control the operational state of the multi-plate friction clutch assembly 214 with a worm gear pair. The worm gear pair may facilitate self-locking without drawing current to actuator. In an embodiment, a combination of motor clutch cam actuation along with pivot clutch actuation would ensure controlling of the operational state of the multi-plate friction clutch assembly 214.

Further, during reverse gear driving of the vehicle, the one-way clutch assembly 210 slips in reverse direction and fails to transmit motion from the input shaft 212 to the output shaft 112 through the first gear drive assembly 302 and the first gear driven assembly 312.

For enabling the reverse gear driving, the transmission system 104 may include a drive ratchet 308 having an internal spline mounted on the input shaft 212. The transmission system 104 may also include a driven ratchet 310 adapted to be coupled to the freely mounted first gear drive assembly 302. For enabling reverse gear driving of the vehicle, the drive ratchet 308 may be adapted to be engaged with the driven ratchet 310. The engagement of the drive ratchet 308 with the driven ratchet 310 would enable bypassing of the one-way clutch assembly 210.

In an embodiment, the transmission system 104 may include at least one of a rack and pinion mechanism and a solenoid assembly adapted to actuate the engagement of the drive ratchet 308 with the driven ratchet 310 to drive the vehicle in the reverse gear.

In an embodiment, the transmission system 104 may include a position sensor adapted to detect an operational state of the multi-plate friction clutch assembly 214. The position sensor may be in communication with the controller. The controller may be adapted to receive details relating to the speed of the vehicle from the speed sensor, the driving load from the throttle sensor, and the operational state of the multi-plate friction clutch assembly 214 from the position sensor. Based on these details, the controller may be adapted to control the engagement of the drive ratchet 308 with the driven ratchet 310. In an embodiment, the controller may be adapted to control the operation of the reverse gear actuation system 110 to enable the engagement of the drive ratchet 308 and the driven ratchet 310.

Figure 4A:
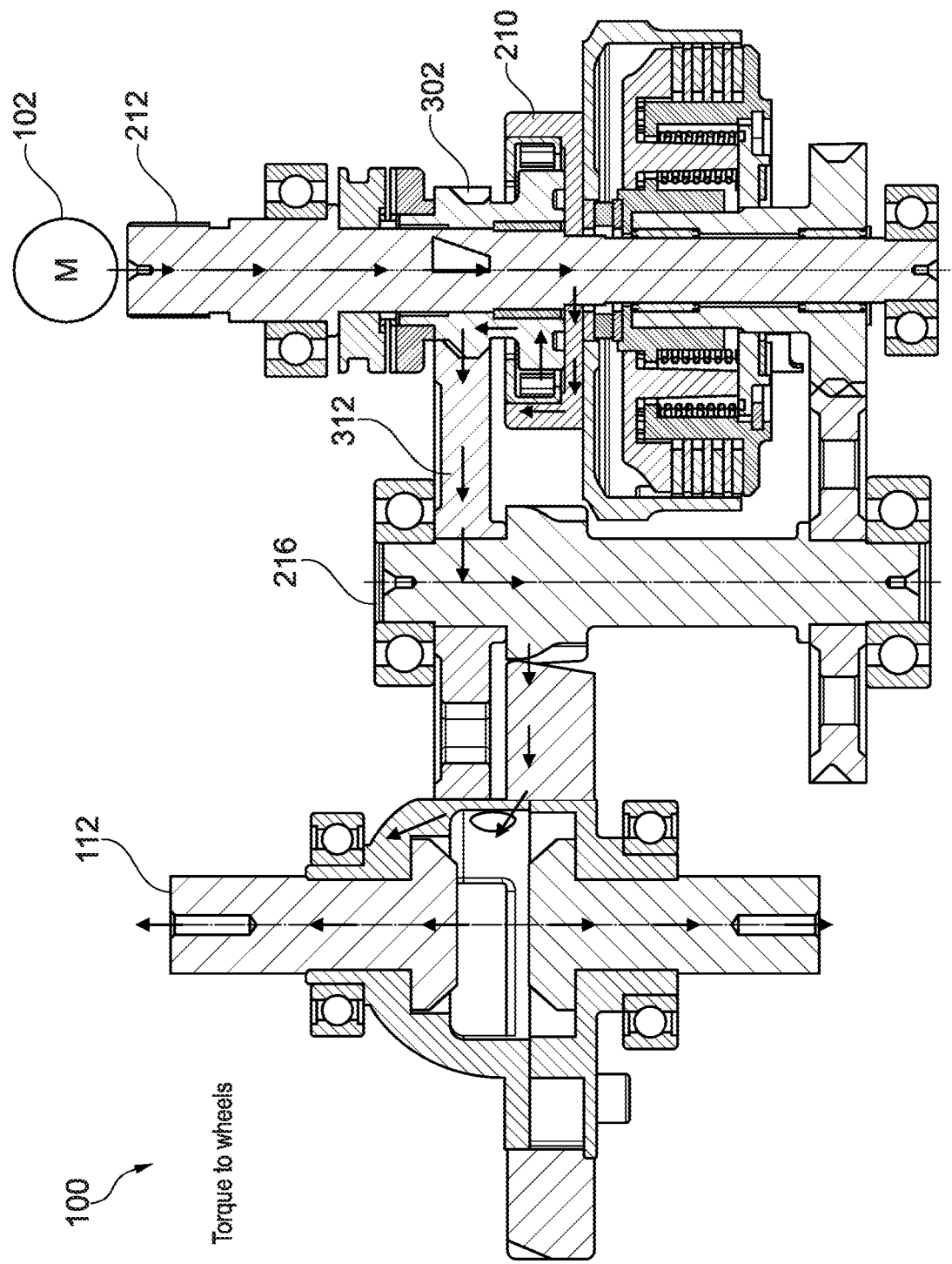
FIG. 4A illustrates a magnified front cross-sectional view of the two-speed transmission system depicting operation in a first gear drive, according to an embodiment of the present disclosure.
Figure 4B:
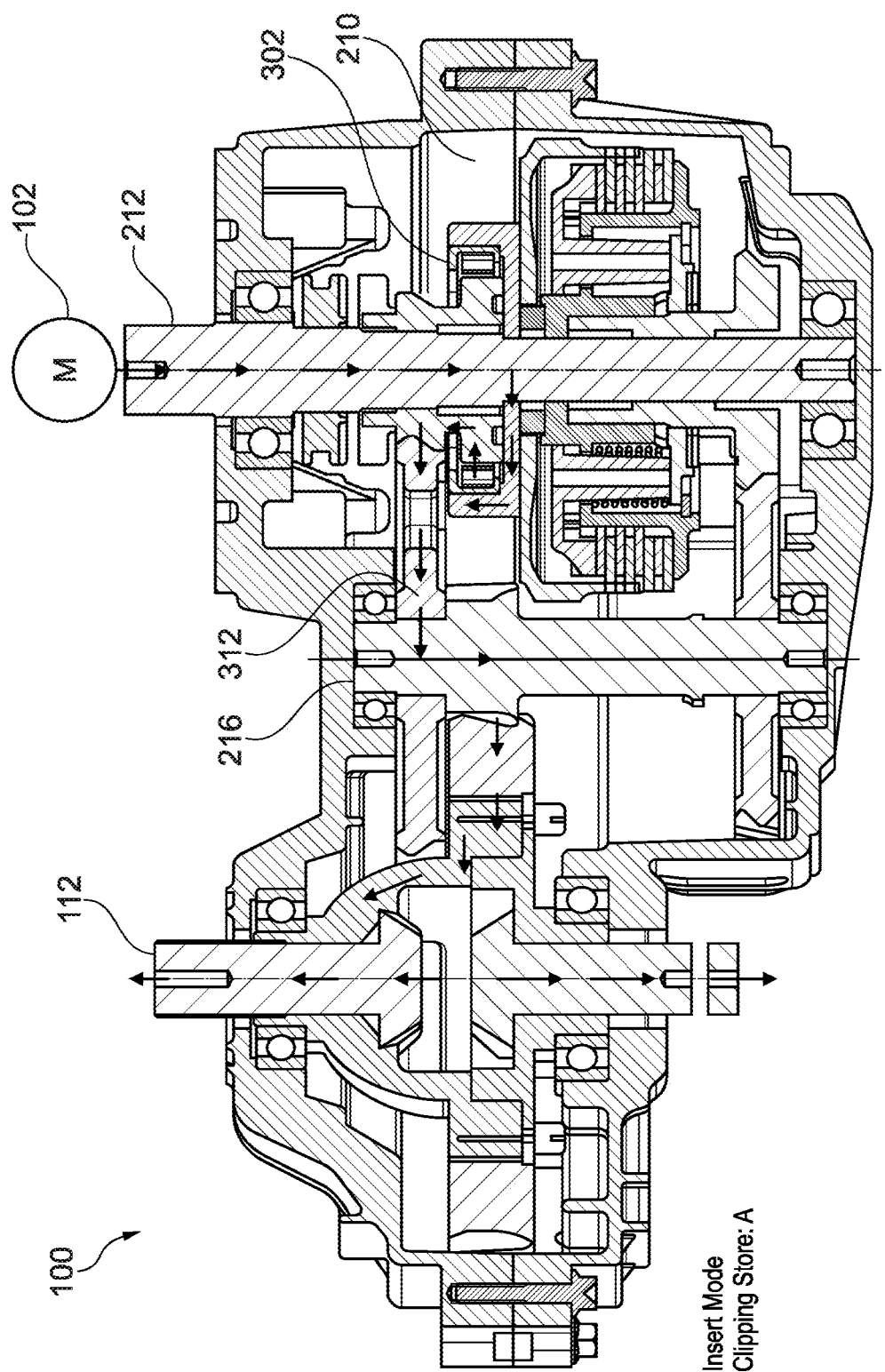
FIG. 4B illustrates a magnified front cross-sectional view of the two-speed transmission system depicting operation in the first gear drive, according to another embodiment of the present disclosure.

FIG. 4A illustrates a magnified front cross-sectional view of the transmission architecture 100 depicting operation through the first gear drive assembly 302, according to an embodiment of the present disclosure. FIG. 4B illustrates another magnified front cross-sectional view of the transmission architecture depicting operation through the first gear drive assembly 302, according to another embodiment of the present disclosure. For the sake of brevity, constructional and operational features of the transmission architecture 100 that are already explained in the description of FIG. 1, FIG. 2, and FIG. 3 are not explained in detail in the description of subsequent figures.

Referring to FIG. 1, FIG. 2, FIG. 3, FIG. 4A, and FIG. 4B, in the present embodiment, the input shaft 212 rotates in the drive direction thereby locking the one-way clutch assembly 210 in the drive direction. Therefore, the power transmission is established through the one-way clutch assembly 210. In this embodiment, the multi-plate friction clutch assembly 214 is in disengaged state and is therefore, slipping. During the transmission in the first gear drive, minimal number of gear meshes are achieved. In the first gear drive, the vehicle is adapted to exhibit high gradeability, i.e., higher payload capacity.

Figure 5A:
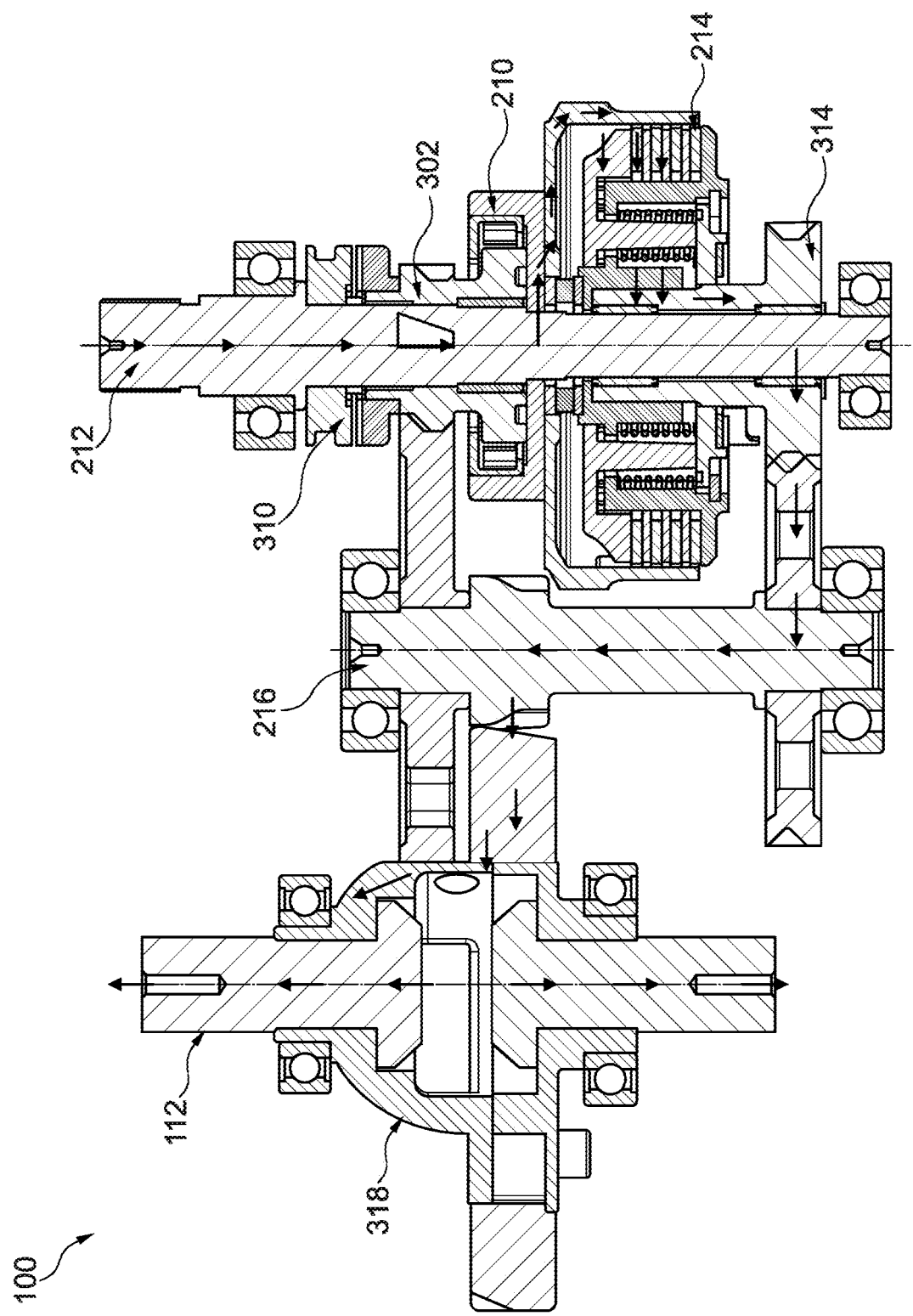
FIG. 5A illustrates a magnified front cross-sectional view of the two-speed transmission system depicting operation in a second gear drive, according to an embodiment of the present disclosure.
Figure 5B:
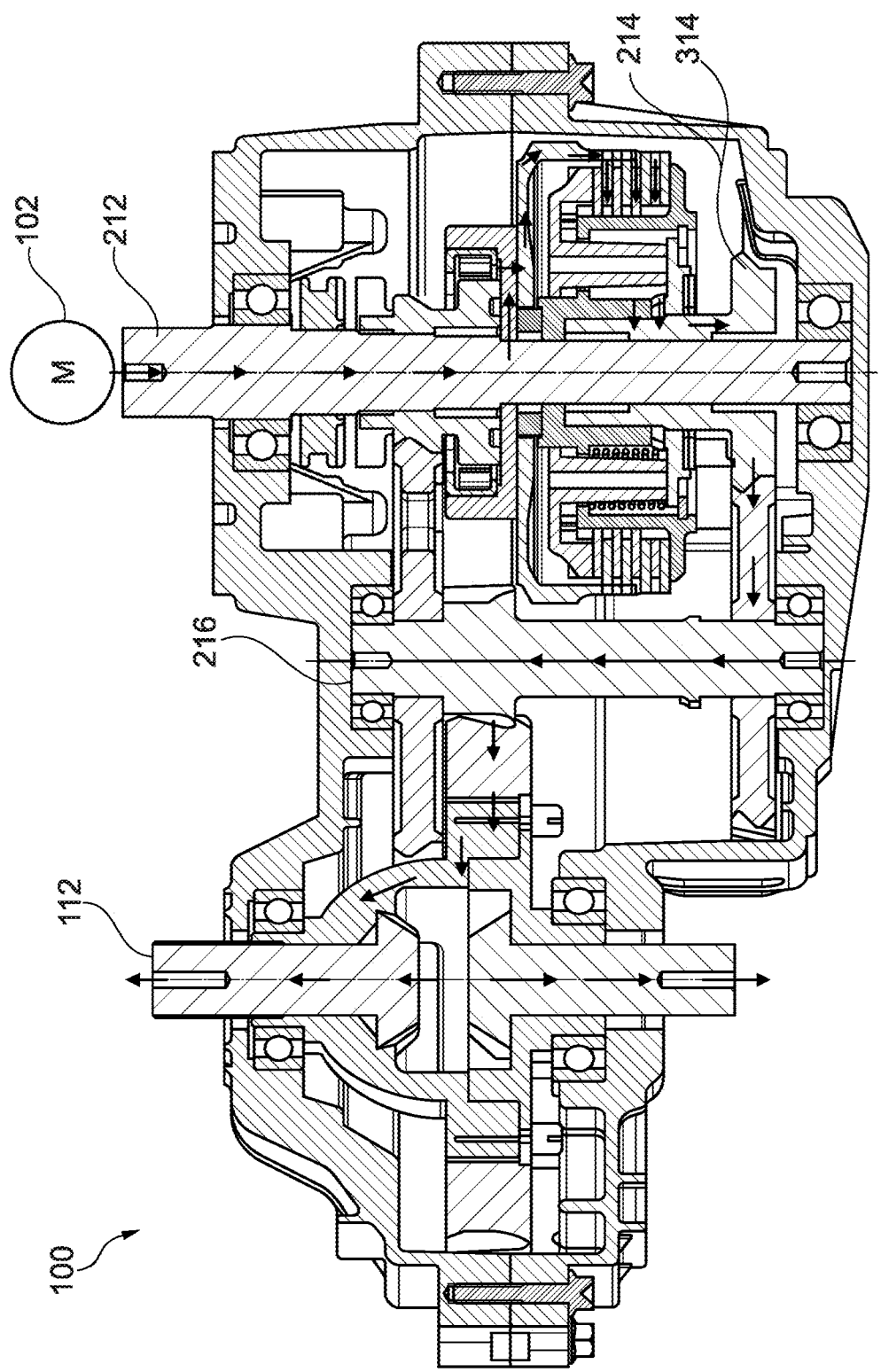
FIG. 5B illustrates a magnified front cross-sectional view of the two-speed transmission system depicting operation in the second gear drive, according to another embodiment of the present disclosure.

FIG. 5A illustrates a magnified front cross-sectional view of the transmission architecture 100 depicting operation through the second gear drive assembly 306, according to an embodiment of the present disclosure. FIG. 5B illustrates another magnified front cross-sectional view of the transmission architecture depicting operation through the second gear drive assembly 306, according to another embodiment of the present disclosure. Referring to FIG. 1, FIG. 2, FIG. 3, FIG. 5A, and FIG. 5B, in the present embodiment, for the uninterrupted torque transmission, the transmission would be achieved through the second gear drive assembly 306. In the present embodiment, the multi-plate friction clutch assembly 214 is in the engaged or the locked state. Further, the one-way clutch assembly 210 may be over running owing to higher rotation per minute of the input shaft 212. The vehicle is adapted to achieve the maximum speed while running in the second gear drive.

Figure 6:
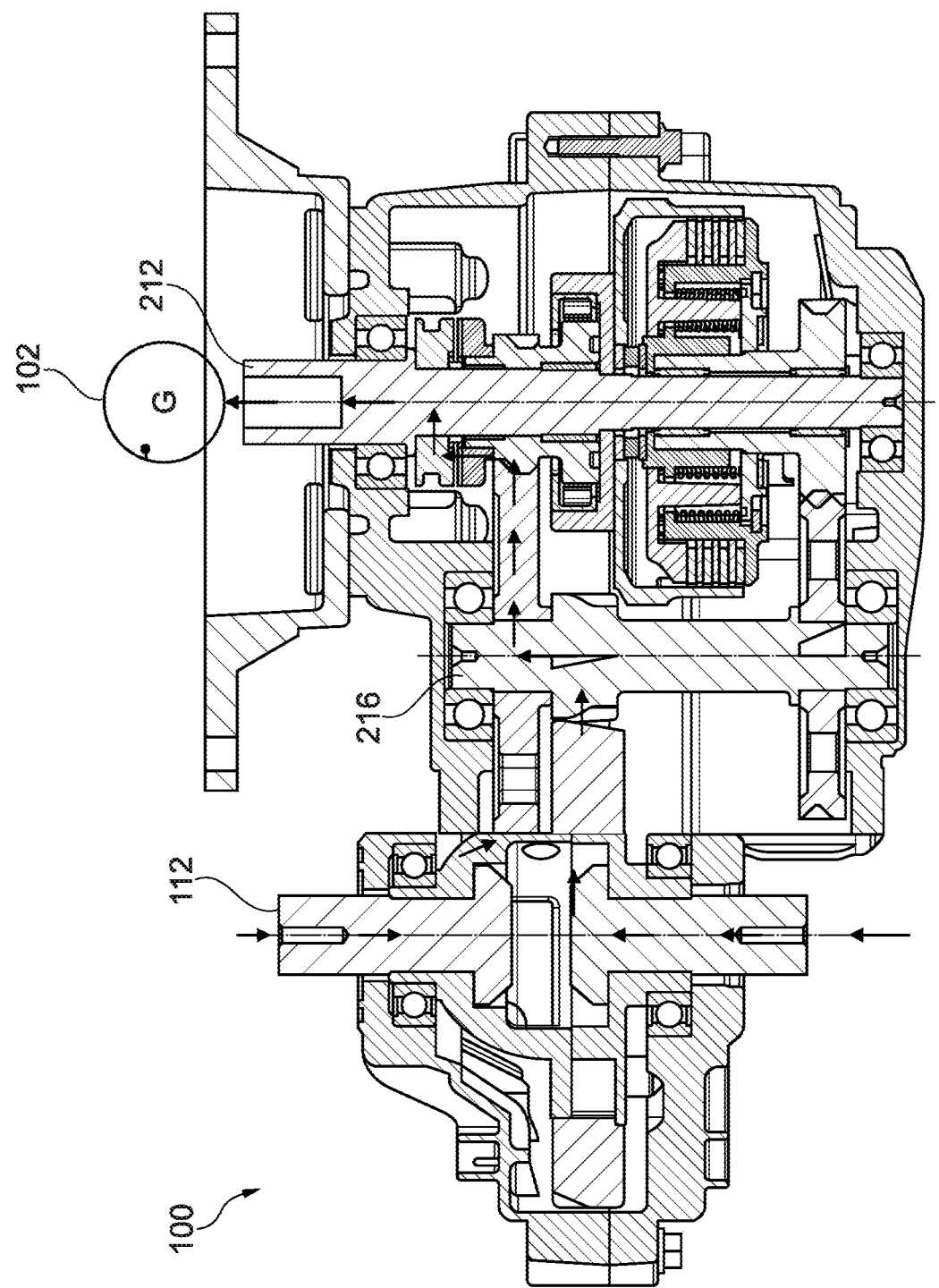
FIG. 6 illustrates a magnified front cross-sectional view of the two-speed transmission system depicting recuperation operation in the first gear drive, according to an embodiment of the present disclosure.

FIG. 6A illustrates a magnified front cross-sectional view of the transmission architecture 100 depicting recuperation operation in the first gear drive, according to an embodiment of the present disclosure. In a recuperation operational mode of the vehicle while driving in the first gear drive, the energy would be recuperated through the first gear drive assembly 302. In this embodiment, the electric motor 102 may act as a generator.

Figure 7:
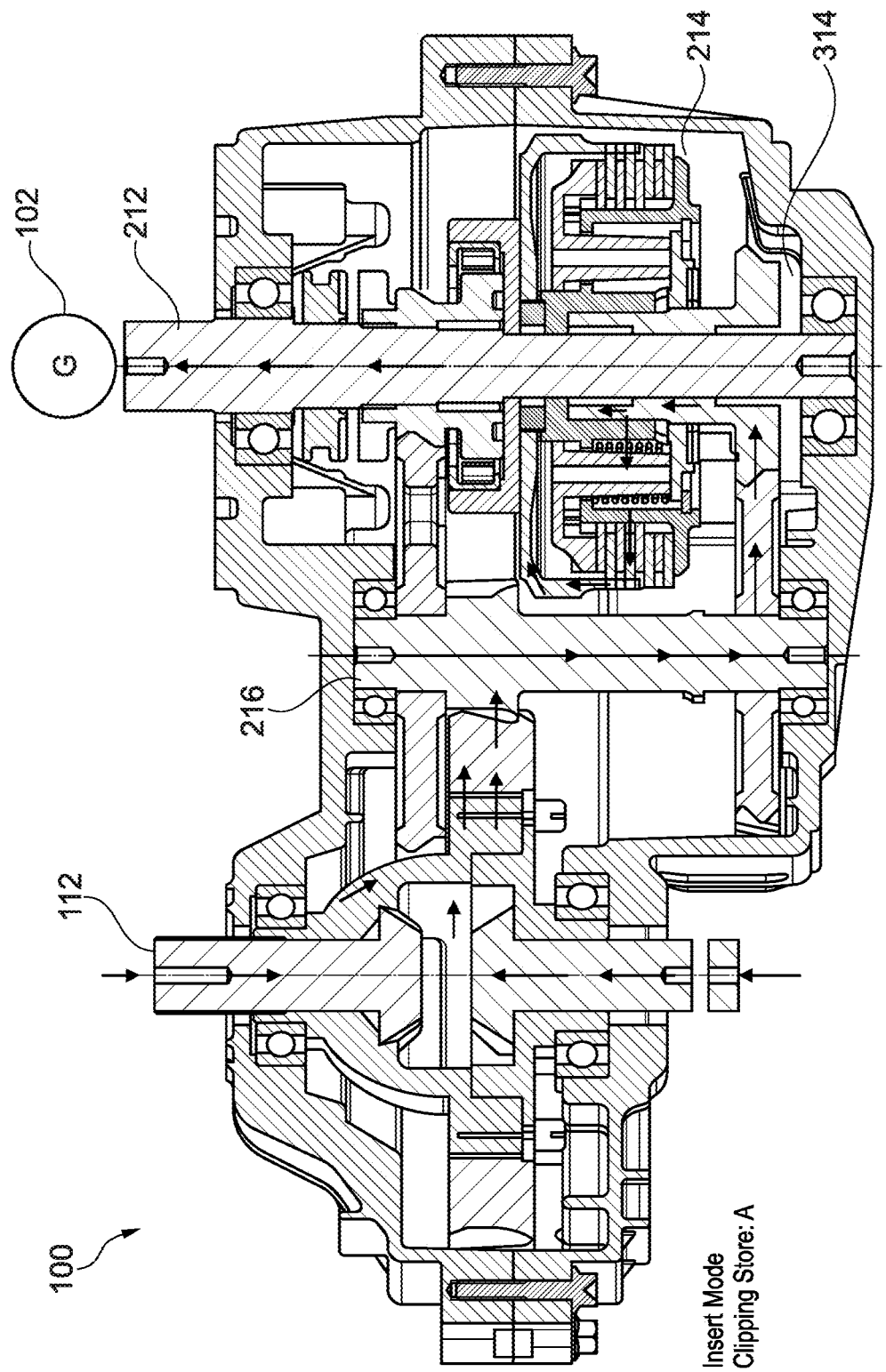
FIG. 7 illustrates a magnified front cross-sectional view of the two-speed transmission system depicting recuperation operation in the second gear drive, according to an embodiment of the present disclosure.

FIG. 7 illustrates a magnified front cross-sectional view of the transmission architecture depicting recuperation operation in the second gear drive, according to an embodiment of the present disclosure. In the recuperation operational mode of the vehicle while driving in the second gear drive, the energy would be recuperated through the second gear drive assembly 306. In this embodiment, the electric motor 102 may act as a generator.

Figure 8:
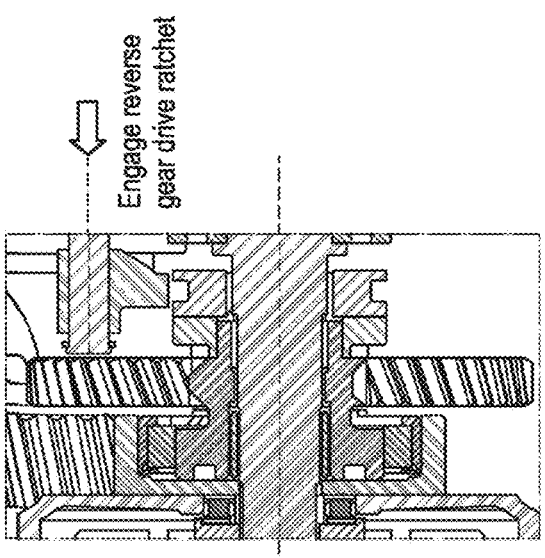
FIG. 8 illustrates a perspective schematic view and a side schematic view of a portion of the two-speed transmission system depicting operation in a reverse gear drive, according to an embodiment of the present disclosure.
Figure 8:
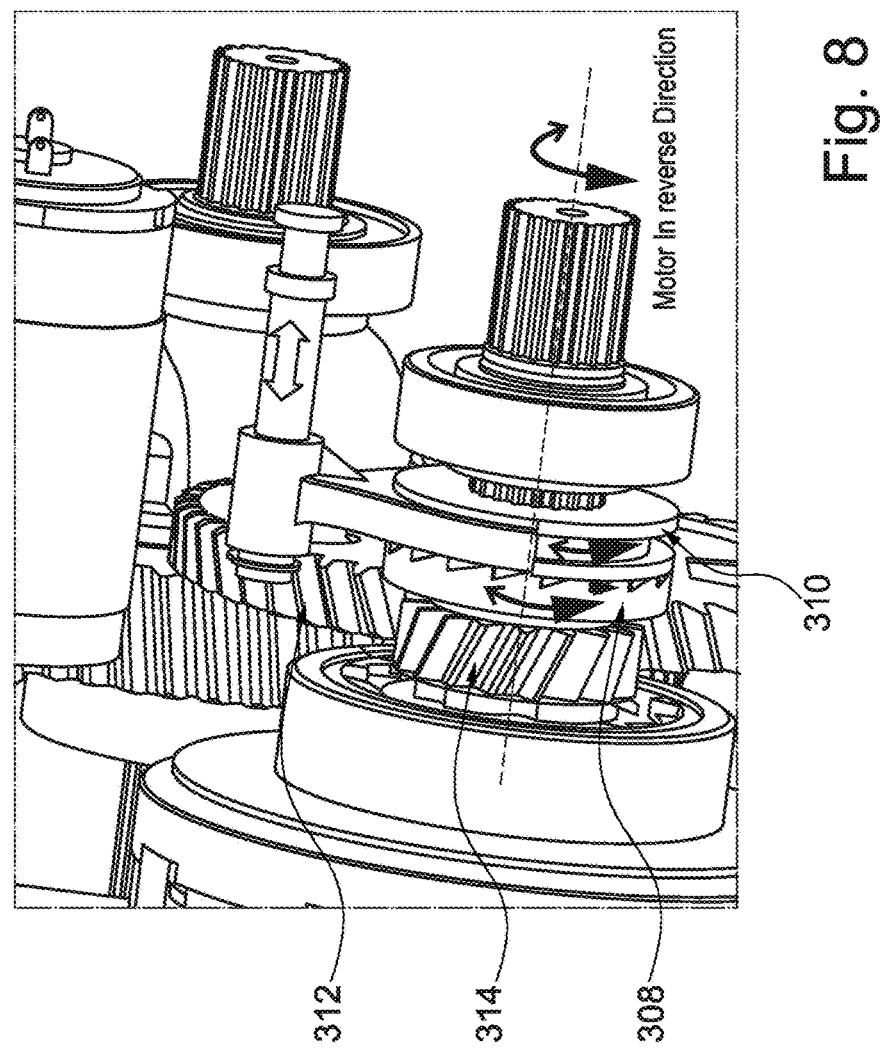

FIG. 8 illustrates a perspective schematic view and a side schematic view of a portion of the transmission architecture 100 depicting operation in a reverse gear drive, according to an embodiment of the present disclosure. As illustrates, as the electric motor 102 rotates in a reverse direction, the drive ratchet 308 and the driven ratchet 310 are engaged. The driven ratchet 310 may be press-fitted on the first gear drive assembly 302 and the drive ratchet 308 may be slidable on the input shaft 212. The engagement of the drive ratchet 308 with the driven ratchet 310 is adapted to bypass the one-way clutch assembly 210 for reverse gear drive transmission.

Particularly, the ratchet teeth may lock in the reverse direction and slip in the drive direction. In an embodiment, even if the engagement is accidental, the transmission lock is avoided in the drive direction. Therefore, while it is a cost-effective solution, it also ensures functional safety. This would also facilitate anti-theft and hill hold features to the vehicle.

Figure 9:
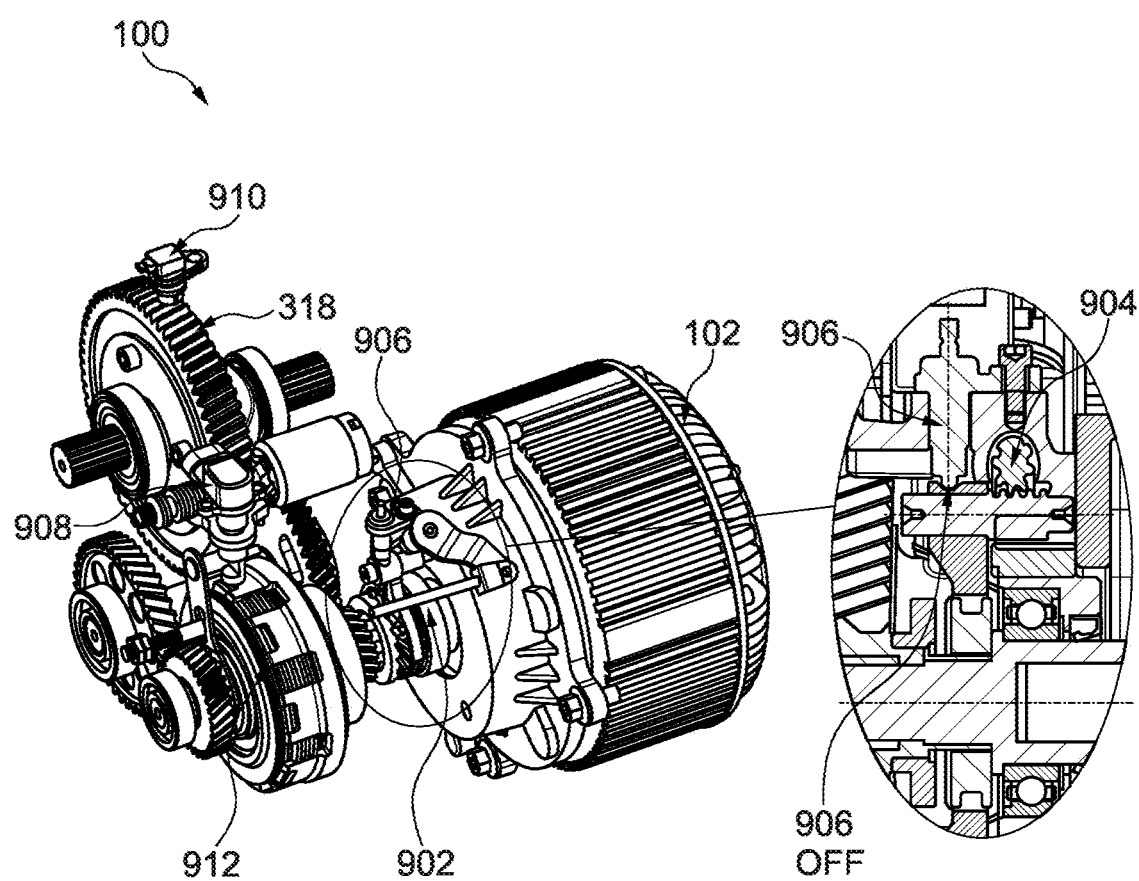
FIG. 9 illustrates views of the two-speed transmission system depicting operation in the reverse gear drive, according to an embodiment of the present disclosure.

FIG. 9 illustrates perspective schematic view of the transmission architecture depicting components enabling operation in the reverse gear drive, according to an embodiment of the present disclosure. The transmission architecture 100 may include a ratchet engagement mechanism 902 for facilitating the reverse gear drive and immobilizer function to the vehicle. As explained earlier, the ratchet engagement mechanism 902 may include, but is not limited to, a rack and pinion mechanism 904.

The transmission architecture 100 may also include a ratchet position switch 906 adapted to indicate a position of the drive ratchet 308 and the driven ratchet 310. Further, the position sensor 908 may be adapted to indicate the operational state of multi-plate friction clutch assembly 214. Similarly, the speed sensor 910 may be adapted to indicate the speed of the vehicle. Further, the one-way clutch assembly 210 and the multi-plate friction clutch assembly 214 are shown a combined clutch 912 in FIG. 9.

Based on the details received from the ratchet position switch 906, the position sensor 908, and the speed sensor 910, the controller may control operation of the ratchet engagement mechanism 902 to control the engagement of the drive ratchet 308 and the driven ratchet 310.

Figure 10:
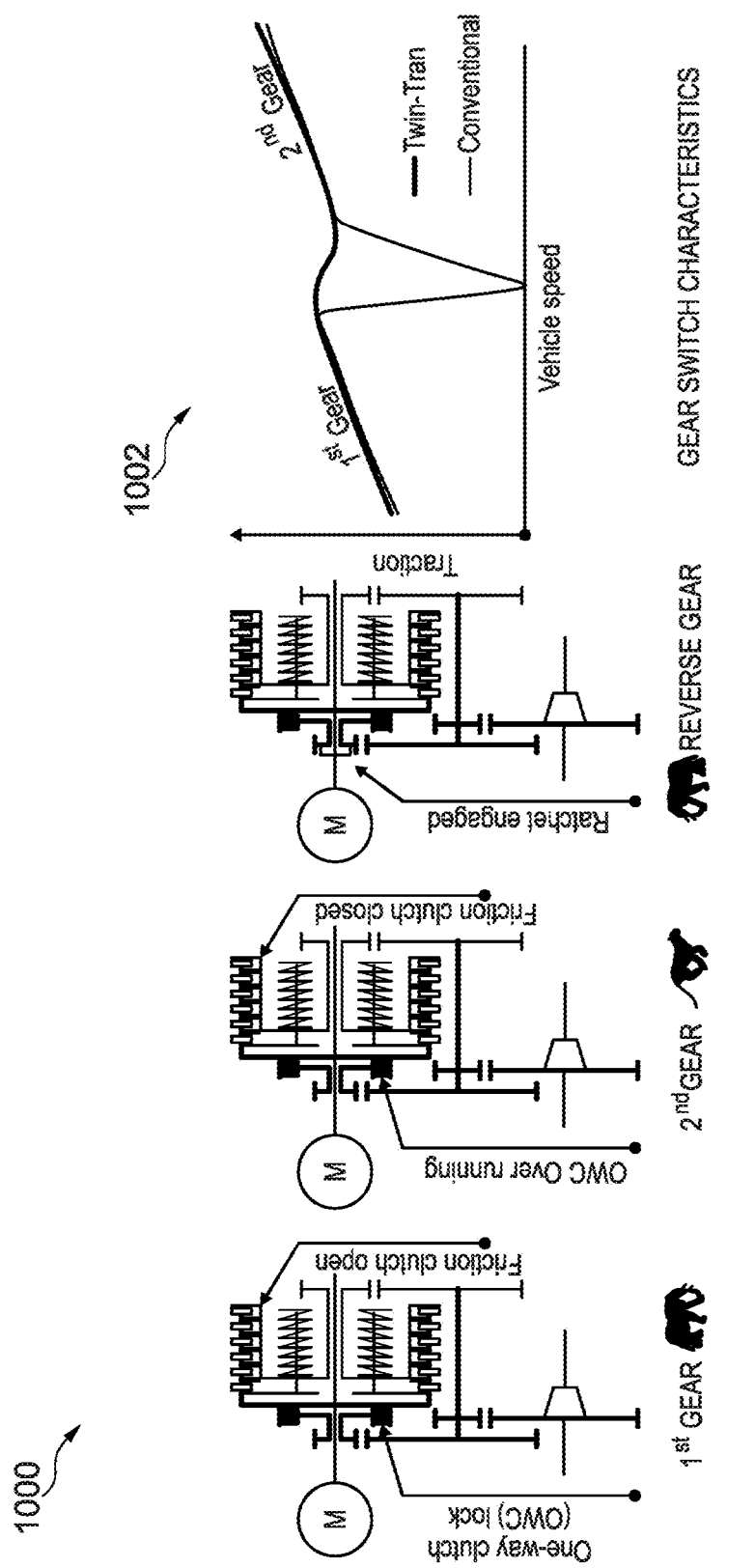
FIG. 10 illustrates a schematic representation depicting operation in a first gear drive, a second gear drive, and a reverse gear drive, according to an embodiment of the present disclosure.

FIG. 10 illustrates a schematic representation 1000 depicting operation of the vehicle in the first gear drive, the second gear drive, and the reverse gear drive, according to an embodiment of the present disclosure. Further, a graph 1002 indicates performance of the vehicle in the first gear drive and the second gear drive in case of conventional transmission systems and the proposed transmission architecture 100. The performance is illustrated in terms of traction and speed of the vehicle in the first gear drive and the second gear drive.

Figure 11:
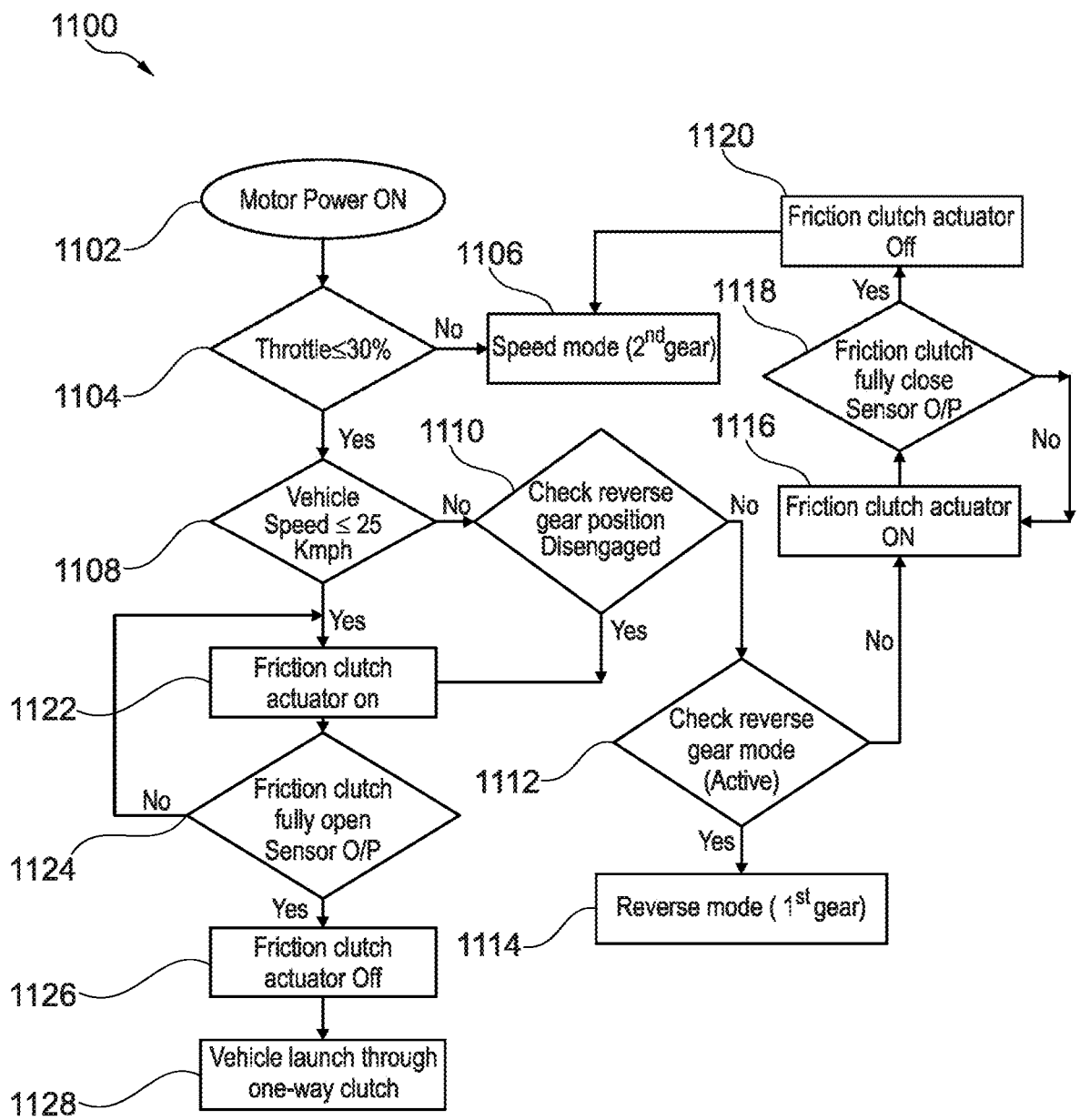
FIG. 11 illustrates a flow chart depicting a method of switching gears in the two-speed transmission system, according to an embodiment of the present disclosure.

FIG. 11 illustrates a flow chart depicting a method 1100 of switching gears in the transmission architecture 100, according to an embodiment of the present disclosure. For the sake of brevity, constructional and operational features of the present disclosure which are already explained in the description of FIG. 1 to FIG. 10 are not explained in detail in the description of FIG. 11.

At a block 1102, the method 1100 includes switching ON the electric motor 102. At a block 1104, the method 1100 includes determining whether the throttle is less than a predefined threshold value, for example, 30% of the maximum limit. In an embodiment, when it is determined that the throttle is not less than the predefined threshold value, the method 1100 branches to a block 1106. At the block 1106, the method 1100 includes switching the vehicle to the second gear drive. In another embodiment, when it is determined that the throttle is less than the predefined threshold value, the method 1100 branches to a block 1108.

At the block 1108, the method 100 includes determining whether the vehicle speed is less than predefined threshold value, for example, 25 kmph. In an embodiment, when it is determined that the vehicle speed is not less than the predefined threshold value, the method 1100 branches to a block 1110. At the block 1110, the method 1100 includes determining whether the reverse gear position is disengaged. In an embodiment, when it is determined that the reverse gear position is not disengaged, the method 1100 branches to a block 1112. At the block 1112, the method 1100 determines whether the vehicle is in a reverse gear mode. In an embodiment, when it is determined that the reverse gear mode is active, the method 1100 branches to a block 1114. At the block 1114, the method 1100 includes actuating the reverse gear drive for the vehicle.

In another embodiment, at the block 1112, when it is determined that the reverse gear mode is not active, the method 1100 branches to a block 1116. At the block 1116, the method 1100 includes switching ON the actuator mechanism for the multi-plate friction clutch assembly 214. At a block 1118, the method 1100 includes determining whether the multi-plate friction clutch assembly 214 is in the engaged state. In an embodiment, when it is determined that the multi-plate friction clutch assembly 214 is not engaged, the method 1100 branches back to the block 1116. In another embodiment, when it is determined that the multi-plate friction clutch plate assembly 214 is engaged, the method 1100 branches to the block 1120. At the block 1120, the method 1100 includes switching OFF the actuator mechanism of the multi-plate friction clutch assembly 214. The method 1100 then branches back to the block 1106.

Referring back to the block 1110, in an embodiment, when it is determined that the reverse gear position is disengaged, the method 1100 branches to a block 1122. At the block 1122, the method 1100 includes switching ON the actuator mechanism for the multi-plate friction clutch assembly 214. At a block 1124, the method 1100 includes determining whether the multi-plate friction clutch assembly 214 is in the engaged state. In an embodiment, when it is determined that the multi-plate friction clutch assembly 214 is not engaged, the method 1100 branches back to the block 1122. In another embodiment, when it is determined that the multi-plate friction clutch plate assembly 214 is engaged, the method 1100 branches to the block 1126. At the block 1126, the method 1100 includes switching OFF the actuator mechanism of the multi-plate friction clutch assembly 214. At a block 1128, the method 1100 includes launching the vehicle in the first gear drive.

Figure 12:
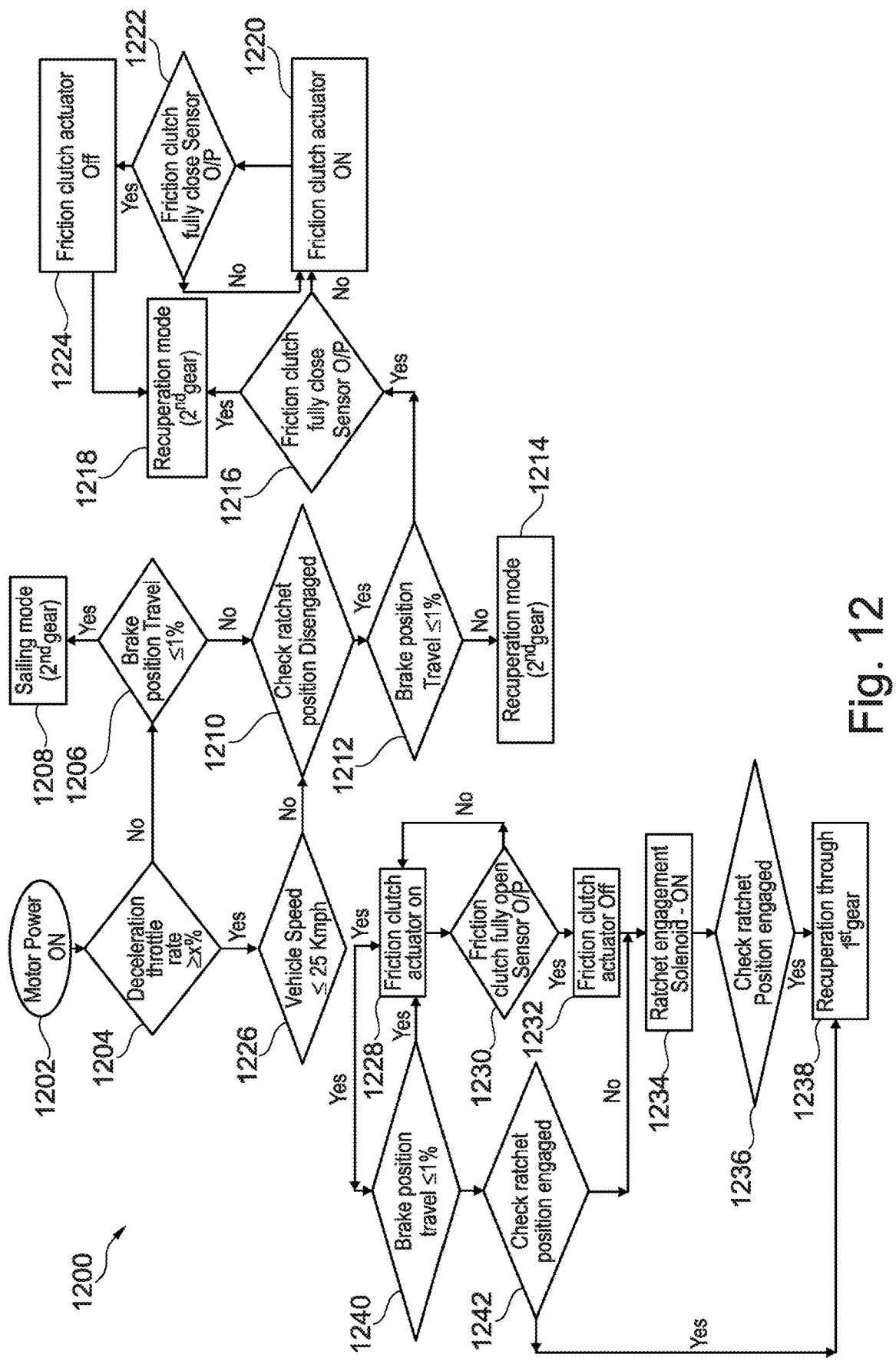
FIG. 12 illustrates a flow chart depicting a method of recuperation in the two-speed transmission system, according to an embodiment of the present disclosure.

FIG. 12 illustrates a flow chart depicting a method 1200 of recuperation in the transmission architecture 100, according to an embodiment of the present disclosure. In the present embodiment, the method 1200 is executed in a fully automatic mode. For the sake of brevity, constructional and operational features of the present disclosure which are already explained in the description of FIG. 1 to FIG. 11 are not explained in detail in the description of FIG. 12.

At a block 1202, the method 1200 includes switching ON the electric motor 102. At a block 1204, the method 1200 includes determining whether a deceleration throttle rate is higher than a predefined threshold value. In an embodiment, when it is determined that the deceleration throttle rate is not higher than the predefined threshold value, the method 1200 branches to a block 1206. At the block 1206, the method 1200 includes determining whether a brake position travel is less than a predefined threshold value, for example, 1% of the maximum value. In an embodiment, when it is determined that the brake position travel is less than the predefined threshold value, the method 1200 branches to a block 1208. At the block 1208, the method 1200 includes a sailing mode of the vehicle in the second gear drive. In another embodiment, at the block 1206, when it is determined the brake position travel is not less than the predefined threshold value, the method 1200 branches to a block 1210. At the block 1210, the method 1200 includes determining whether the ratchet position is disengaged. In an embodiment, when it is determined that ratchet position is disengaged, the method 1200 branches to a block 1212. At the block 1212, the method 1200 includes whether the brake position travel is less than a predefined threshold value, for example, 1% of the maximum value. In an embodiment, when it is determined that the brake position travel is not less than the predefined threshold value, the method 1200 branches to a block 1214. At the block 1214, the method 1200 includes activating the recuperation mode of the vehicle in the second gear drive.

In another embodiment, at the block 1212, when it is determined that the brake position travel is less than the predefined threshold value, the method 1200 branches to a block 1216. At the block 1216, the method 1200 includes determining whether the multi-plate friction clutch assembly 214 is in the engaged state. In an embodiment, when it is determined that the multi-plate friction clutch plate assembly 214 is engaged, the method 1200 branches to a block 1218. At the block 1218, the method 1200 includes activating the recuperation mode of the vehicle in the second gear drive. In an embodiment, when it is determined that the multi-plate friction clutch assembly 214 is not engaged, the method 1200 branches back to the block 1220.

At the block 1220, the method 1200 includes switching ON the actuator mechanism for the multi-plate friction clutch assembly 214. At a block 1222, the method 1200 includes determining whether the multi-plate friction clutch assembly 214 is in the engaged state. In an embodiment, when it is determined that the multi-plate friction clutch assembly 214 is not engaged, the method 1200 branches back to the block 1220. In another embodiment, when it is determined that the multi-plate friction clutch plate assembly 214 is engaged, the method 1200 branches to the block 1224. At the block 1224, the method 1200 includes switching OFF the actuator mechanism of the multi-plate friction clutch assembly 214. The method 1200 then branches back to the block 1218.

Referring back to the block 1204, when it is determined that the deceleration throttle rate is more than the predefined threshold value, the method 1200 branches to a block 1226. At the block 1226, the method 1200 includes determining whether the vehicle speed is less than a predefined threshold value, for example, 25 kmph. In an embodiment, when it is determined that the vehicle speed is not less than the predefined threshold value, the method 1200 branches to the block 1210. In another embodiment, when it is determined that the vehicle speed is less than the predefined threshold value, the method 1200 branches to a block 1228 and a block 1240.

At the block 1228, the method 1200 includes switching ON the actuator mechanism for the multi-plate friction clutch assembly 214. At a block 1230, the method 1200 includes determining whether the multi-plate friction clutch assembly 214 is in the engaged state. In an embodiment, when it is determined that the multi-plate friction clutch assembly 214 is not engaged, the method 1200 branches back to the block 1228. In another embodiment, when it is determined that the multi-plate friction clutch plate assembly 214 is engaged, the method 1200 branches to the block 1232. At the block 1232, the method 1200 includes switching OFF the actuator mechanism of the multi-plate friction clutch assembly 214. The method 1200 then branches back to a block 1234. At the block 1234, the method 1200 includes switching ON the ratchet engagement solenoid. At a block 1236, the method 1200 includes determining whether the ratchet position is engaged. At a block 1238, the method 1200 includes activating the recuperation mode of the vehicle in the first gear drive.

Referring back to the block 1240, the method 1200 includes determining whether the brake position travel is less than a predefined threshold value, for example, 1% of the maximum value. In an embodiment, when it is determined that the brake position travel is less than the predefined threshold value, the method 1200 branches to the block 1228. In another embodiment, when it is determined that the brake position travel is not less than the predefined threshold value, the method 1200 branches to a block 1242. At the block 1242, the method 1200 includes determining whether the ratchet position is engaged. In an embodiment, when it determined that the ratchet position is engaged, the method 1200 branches to the block 1238. In another embodiment, when it is determined that the ratchet position is not engaged, the method 1200 branches to the block 1234.

FIG. 13 illustrates a flow chart depicting a method 1300 of recuperation in the transmission architecture 1300, according to another embodiment of the present disclosure. In the present embodiment, the method 1300 is executed in a semi-automatic mode. For the sake of brevity, constructional and operational features of the present disclosure which are already explained in the description of FIG. 1 to FIG. 12 are not explained in detail in the description of FIG. 13.

At a block 1302, the method 1300 includes switching ON the electric motor 102. At a block 1304, the method 1300 includes determining whether a deceleration throttle rate is higher than a predefined threshold value. In an embodiment, when it is determined that the deceleration throttle rate is not higher than the predefined threshold value, the method 1300 branches to a block 1306. At the block 1306, the method 1300 includes activating the recuperation mode of the vehicle in the second gear drive.

In another embodiment, at the block 1304, when it is determined that the deceleration throttle rate is higher than the predefined threshold value, the method 1300 branches to a block 1308. At the block 1308, the method 1300 includes determining whether the vehicle speed is less than a predefined threshold value, for example, 25 kmph. In an embodiment, when it is determined that the vehicle speed is not less than the predefined threshold value, the method 1300 branches to a block 1310.

At the block 1310, the method 1300 includes determining whether the ratchet position is disengaged. In an embodiment, when it is determined that ratchet position is disengaged, the method 1300 branches to a block 1312.

At the block 1312, the method 1300 includes switching ON the actuator mechanism for the multi-plate friction clutch assembly 214. At a block 1314, the method 1300 includes determining whether the multi-plate friction clutch assembly 214 is in the engaged state. In an embodiment, when it is determined that the multi-plate friction clutch assembly 214 is not engaged, the method 1300 branches back to the block 1312. In another embodiment, when it is determined that the multi-plate friction clutch plate assembly 214 is engaged, the method 1300 branches to the block 1316. At the block 1316, the method 1300 includes switching OFF the actuator mechanism of the multi-plate friction clutch assembly 214. The method 1300 then branches back to the block 1306.

Referring back to the block 1308, in an embodiment, when it is determined that the vehicle speed is less than the predefined threshold value, the method 1300 branches to a block 1318. At the block 1318, the method 1300 includes switching ON the actuator mechanism for the multi-plate friction clutch assembly 214. At a block 1320, the method 1300 includes determining whether the multi-plate friction clutch assembly 214 is in the engaged state. In an embodiment, when it is determined that the multi-plate friction clutch assembly 214 is not engaged, the method 1300 branches back to the block 1318. In another embodiment, when it is determined that the multi-plate friction clutch plate assembly 214 is engaged, the method 1300 branches to the block 1322. At the block 1322, the method 1300 includes switching OFF the actuator mechanism of the multi-plate friction clutch assembly 214. The method 1300 then branches back to a block 1324. At the block 1324, the method 1300 includes switching ON the ratchet engagement solenoid. At a block 1326, the method 1300 includes determining whether the ratchet position is engaged. At a block 1328, the method 1300 includes activating the recuperation mode of the vehicle in the first gear drive.

As would be gathered, the transmission system 104 of the present disclosure offers a comprehensive approach of supplying power to the electric vehicle for achieving increased gradeability and higher top speed. The transmission system 104 provides a greater speed and torque range with a smaller electric motor. In addition to this, the two-speed transmission system 104 ensures that the electric motor 102 operates in highest efficient zones for a greater portion in a selected drive cycle. This further enhances lesser energy consumption. Moreover, the transmission system 104 ensures increased payload capacity and gradeability performance without increasing motor or battery size and without compromising vehicle top speed.

The first gear drive is selected to satisfy payload & gradeability requirements of the vehicle while the second gear drive is selected to cater to the maximum vehicle speed. The transmission system 104 allows for seamless switching between these two gears without any torque interruption by using the one-way clutch assembly 210 and the multi-plate friction clutch assembly 214.

Further, the transmission system 114 has the one-way clutch assembly 210 and the multi-plate friction clutch assembly 214 positioned as the combine clutch on the input shaft 212, which would ensure lower torque. This results in down-sizing both the one-way clutch assembly 210 and the multi-plate friction clutch assembly 214, leading to compact size. Further, facilitating reverse gear transmission with ratchets helps in achieving reverse gear functionality in a compact layout. The differential gear pair system is also appropriately positioned on counter shaft 216 to bring down the system overall package volume. Therefore, the transmission system 104 and therefore, the transmission architecture 100 of the present disclosure are comprehensive, simple in construction and assembly, operation-effective, cost-effective, flexible in implementation, and has a longer service life.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A two-speed transmission system for an electric vehicle, the two-speed transmission system comprising:
    a housing;
    a one-way clutch assembly disposed in the housing and adapted to be mounted on an input shaft and to be coupled with a first gear drive assembly;
    a multi-plate friction clutch assembly disposed in the housing and adapted to be mounted on the input shaft and comprising a clutch hub disposed in the housing and mounted on the input shaft;
    a second gear drive assembly freely mounted on the input shaft and comprising an external spline on an outer diameter adapted to be engaged with the clutch hub of the multi-plate friction clutch assembly, and
    wherein the one-way clutch assembly is adapted to rotate to operate the vehicle in a first gear drive when the input shaft is rotated in a drive direction, and the multi-plate friction clutch assembly is in a disengaged state when the vehicle is operated in the first gear drive.

2. The two-speed transmission system as claimed in claim 1, wherein the second gear drive assembly is adapted to freely rotate along with the clutch hub of the multi-plate friction clutch assembly on the input shaft, when the vehicle is operated in the first gear drive.

3. The two-speed transmission system as claimed in claim 1, wherein the multi-plate friction clutch assembly is adapted to be in an engaged state when the vehicle is operated in a second gear drive.

4. The two-speed transmission system as claimed in claim 1, wherein the multi-plate friction clutch assembly comprises at least one roller bearing disposed between the input shaft and the clutch hub.

5. The two-speed transmission system as claimed in claim 1, wherein a housing of the multi-plate friction clutch assembly includes a riveted one-way clutch flange positioned on the input shaft, and the one-way clutch flange is press-fitted into a housing of the one-way clutch assembly.

6. The two-speed transmission system as claimed in claim 1, wherein the multi-plate friction clutch assembly comprises:
    a friction plate comprising outer lugs adapted to slide in a housing of the multi-plate friction clutch assembly;
    a pressure plate comprising lugs on an internal diameter adapted to slide an outer diameter of the clutch hub; and
    a number of compression springs adapted to exert clamping pressure to keep the friction plate and the pressure plate together.

7. The two-speed transmission system as claimed in claim 1, further comprising:
    a speed sensor adapted to detect a speed of the vehicle;
    a throttle sensor adapted to detect a driving load of the vehicle; and
    a controller in communication with the speed sensor and the throttle sensor and configured to control an operational state of the multi-plate friction clutch assembly based on the speed of the vehicle and the driving load of the vehicle.

8. The two-speed transmission system as claimed in claim 1, comprising:
    a drive ratchet including an internal spline mounted on the input shaft; and
    a driven ratchet adapted to be coupled to the freely mounted first gear drive assembly, wherein the drive ratchet is adapted to be engaged with the driven ratchet to bypass the one-way clutch assembly during reverse gear driving of the vehicle.

9. The two-speed transmission system as claimed in claim 8, further comprising at least one of a rack and pinion mechanism and a solenoid assembly adapted to actuate an engagement of the drive ratchet with the driven ratchet to drive the vehicle in the reverse gear.

10. The two-speed transmission system as claimed in claim 8, further comprising:
    a position sensor adapted to detect an operational state of the multi-plate friction clutch assembly;
    a speed sensor adapted to detect a speed of the vehicle;
    a throttle sensor adapted to detect a driving load of the vehicle; and
    a controller in communication with the position sensor, the speed sensor, and the throttle sensor and configured to control an engagement of the drive ratchet with the driven ratchet based on the operational state of the multi-plate friction clutch assembly, the speed of the vehicle, and the driving load of the vehicle.

11. An electric vehicle comprising:
    an electric motor;
    an input shaft coupled with the electric motor; and
    a two-speed transmission system coupled to the input shaft and comprising:
        a housing;
        a one-way clutch assembly disposed in the housing and adapted to be mounted on an input shaft and to be coupled with a first gear drive;
        a multi-plate friction clutch assembly disposed in the housing and adapted to be mounted on the input shaft and comprising a clutch hub disposed in the housing and mounted on the input shaft; and
        a second gear drive freely mounted on the input shaft and comprising an external spline on an outer diameter adapted to be engaged with the clutch hub of the multi-plate friction clutch assembly,
    wherein the one-way clutch assembly is adapted to rotate to operate the vehicle in the first gear drive when the input shaft is rotated in a drive direction, and the multi-plate friction clutch assembly is in a disengaged state when the vehicle is operated in the first gear drive.

12. The electric vehicle as claimed in claim 11, further comprising an adapter flange adapted to couple the electric motor with the housing of the two-speed transmission system.

13. A two-speed transmission system for an electric vehicle, the two-speed transmission system comprising:
    a one-way clutch assembly mounted on an input shaft and couplable with a first gear drive assembly;

a multi-plate friction clutch assembly mounted on the input shaft and comprising a clutch hub mounted on the input shaft;

a second gear drive assembly mounted freely rotatable on the input shaft and comprising an external spline on an outer diameter adapted to be engaged with the clutch hub of the multi-plate friction clutch assembly;

a drive ratchet including an internal spline mounted on the input shaft; and a driven ratchet adapted to be coupled to the freely mounted first gear drive assembly, wherein the drive ratchet is adapted to be engaged with the driven ratchet to bypass the one-way clutch assembly during reverse gear driving of the vehicle;

wherein the one-way clutch assembly rotates to operate the vehicle in a first gear drive when the input shaft is rotated in a drive direction, and the multi-plate friction clutch assembly is in a disengaged state when the vehicle is operated in the first gear drive; and the multi-plate friction clutch assembly is movable to an engaged state when the vehicle is operated in a second gear drive.

14. The two-speed transmission system as claimed in claim 13, wherein the multi-plate friction clutch assembly comprises at least one roller bearing disposed between the input shaft and the clutch hub.

15. The two-speed transmission system as claimed in claim 13, wherein a housing of the multi-plate friction clutch assembly includes a riveted one-way clutch flange positioned on the input shaft, and the one-way clutch flange is press-fitted into a housing of the one-way clutch assembly.

16. The two-speed transmission system as claimed in claim 13, wherein the multi-plate friction clutch assembly comprises:

a friction plate comprising outer lugs adapted to slide in a housing of the multi-plate friction clutch assembly;

a pressure plate comprising lugs on an internal diameter adapted to slide an outer diameter of the clutch hub; and a number of compression springs adapted to exert clamping pressure to keep the friction plate and the pressure plate together.

17. The two-speed transmission system as claimed in claim 13, further comprising:

a speed sensor adapted to detect a speed of the vehicle;

a throttle sensor adapted to detect a driving load of the vehicle; and a controller in communication with the speed sensor and the throttle sensor and configured to control an operational state of the multi-plate friction clutch assembly based on the speed of the vehicle and the driving load of the vehicle.

18. The two-speed transmission system as claimed in claim 13, further comprising at least one of a rack and pinion mechanism and a solenoid assembly adapted to actuate an engagement of the drive ratchet with the driven ratchet to drive the vehicle in the reverse gear.

19. The two-speed transmission system as claimed in claim 13, further comprising:

a position sensor adapted to detect an operational state of the multi-plate friction clutch assembly;

a speed sensor adapted to detect a speed of the vehicle;

a throttle sensor adapted to detect a driving load of the vehicle; and a controller in communication with the position sensor, the speed sensor, and the throttle sensor and configured to control an engagement of the drive ratchet with the driven ratchet based on the operational state of the multi-plate friction clutch assembly, the speed of the vehicle, and the driving load of the vehicle.

* * * * *